United States Patent [19]
Kalmbach

[11] Patent Number: 4,947,657
[45] Date of Patent: Aug. 14, 1990

[54] AUXILIARY AIR CONDITIONING APPARATUS AND METHOD FOR AIR CONDITIONED VEHICLES

[76] Inventor: John F. Kalmbach, 9805 Gray Blvd., Tex. 78758

[21] Appl. No.: 362,036

[22] Filed: Jun. 5, 1989

[51] Int. Cl.⁵ .......................................... F25B 27/00
[52] U.S. Cl. ................................................... 62/236
[58] Field of Search ................... 62/236, 239, 244, 175

[56] References Cited

U.S. PATENT DOCUMENTS

| | | | |
|---|---|---|---|
| 3,315,474 | 4/1967 | Farer | 62/236 |
| 3,512,373 | 5/1970 | White | 62/236 |
| 3,720,842 | 3/1973 | Martin et al. | 62/236 |
| 3,974,660 | 8/1976 | Farr | 62/236 |
| 3,976,458 | 8/1976 | Krug | 62/236 X |
| 4,051,691 | 10/1977 | Dawkins | 62/236 |
| 4,720,980 | 1/1988 | Howland | 62/236 |
| 4,762,170 | 8/1988 | Nijjar et al. | 62/236 X |

*Primary Examiner*—Lloyd L. King
*Attorney, Agent, or Firm*—J. Nevin Shaffer, Jr.; Russell D. Culbertson

[57] ABSTRACT

An auxiliary air conditioning system is provided for vehicles having a primary air conditioning system. The vehicle's primary air conditioning system includes a primary compressor powered by the vehicle engine through a suitable mechanical linkage, a primary condenser, a primary evaporator and blower, and a cooled air distribution system. A preferred auxiliary air conditioning system, according to the invention, is incorporated into the primary air conditioning system and adapted to provide refrigerated air conditioning when the primary compressor and vehicle engine are not operating. One preferred auxiliary air conditioning apparatus includes an auxiliary compressor powered by an auxiliary compressor electric motor, and an auxiliary condenser and electric powered condenser fan. The auxiliary compressor is connected for receiving evaporated refrigerant from the primary evaporator, compressing the refrigerant, and delivering the compressed refrigerant to the auxiliary condenser for condensing. A control system prevents the operation of the auxilary compressor when the vehicle engine is on. The auxiliary condenser is connected to deliver condensed refrigerant to the primary evaporator where the refrigerant is evaporated to provide cool air to be distributed similarly to the primary air conditioning system. In alternate forms of the invention, the auxiliary air conditioning system may be a complete separate system including an auxiliary evaporator and blower that is separated from the auxiliary compressor and condenser. The separated auxiliary air conditioning components are positioned on or inside the vehicle so as not to affect the vehicle aerodynamics and vehicle height.

5 Claims, 3 Drawing Sheets

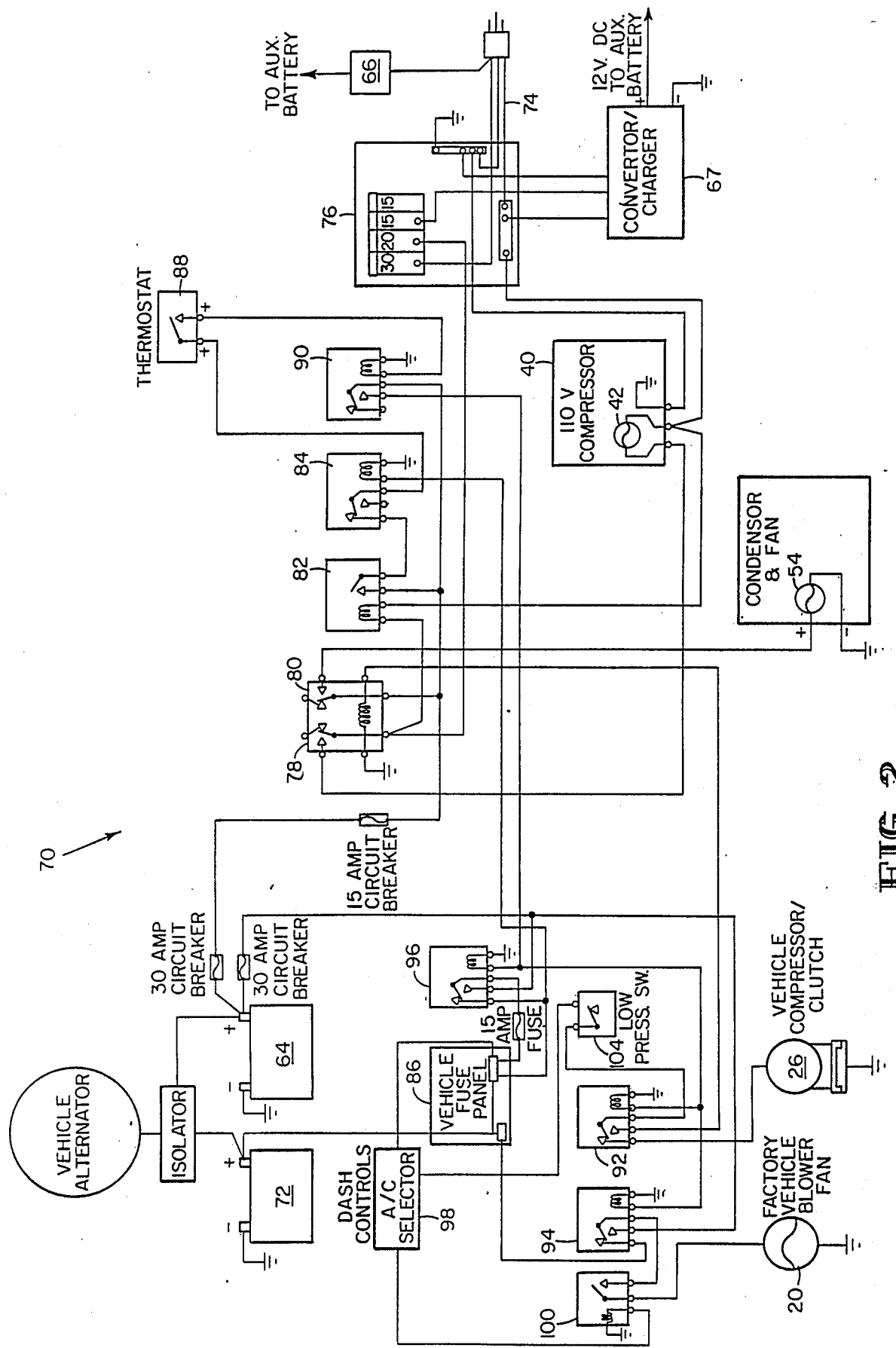

AUXILIARY AIR CONDITIONING APPARATUS AND METHOD FOR AIR CONDITIONED VEHICLES

BACKGROUND OF THE INVENTION

The invention is related to refrigerated air conditioning systems for vehicles such as recreational vehicles and the like, and more particularly, to auxiliary air conditioning apparatus that may be operated on regular household current while the vehicle is stationary. The invention also encompasses methods for providing auxiliary air conditioning for vehicles.

Recreational vehicles (RVs) and the like are commonly supplied with refrigerated air conditioning, both while the vehicle is moving and while it is stationary. Such vehicles generally include a primary air conditioning system that is powered through the vehicle's engine, the compressor of the primary air conditioning system being powered through a direct mechanical linkage with the vehicle's engine. The primary air conditioning system, being powered by the vehicle's engine, is suitable for providing air conditioning only while the vehicle is moving because the engines of such vehicles are not designed to operate for long periods of time as stationary power generators.

RV's and the like commonly include an auxiliary air conditioning system comprising one or more separate air conditioning units often mounted on the roof of the vehicle for supplying air conditioning when the vehicle is stationary for long periods. Such separate air conditioning units are commonly adapted to be powered by household alternating current. The alternating current for powering the separate air conditioning units may be supplied by an external source connected to the vehicle, from a self-contained engine and generator unit mounted on the vehicle, or from storage batteries mounted on the vehicle, through a suitable DC to AC inverter.

There were a number of problems associated with the prior art methods for supplying refrigerated air conditioning to a recreational vehicle and the like while the vehicle was stationary. First, the separate roof mounted air conditioning units were unsightly and also adversely affected the aerodynamics of the vehicle. The separate roof mounted air conditioning units also increased the height of the vehicle making the vehicle more difficult to garage and also making the vehicle susceptible to damage from low overhangs. Furthermore, the separate roof mounted air conditioning units distributed refrigerated air very inefficiently since each unit had its own separate blower and vent. Also, the entirely separate primary and auxiliary air conditioning systems resulted in a multiplicity of common parts which increased the overall weight of the vehicle.

SUMMARY OF THE INVENTION

It is generally an object of the invention to provide an auxiliary refrigerated air conditioning apparatus and method adapted to overcome the above described problems associated with auxiliary air conditioning for vehicles and the like.

More particularly, it is an object of the invention to provide auxiliary refrigerated air conditioning apparatus for vehicles that does not adversely affect the aerodynamics of the vehicle or increase the height of the vehicle.

Another object of the invention is to provide auxiliary air conditioning apparatus for vehicles that provides for an improved distribution of refrigerated air throughout the vehicle.

In furtherance of these objectives, a vehicle having a primary refrigerated air conditioning system powered by the vehicle's engine is provided with an auxiliary electrically powered compressor. The auxiliary compressor is incorporated into the primary air conditioning system to provide air conditioning while the vehicle's engine is not operating. By incorporating the auxiliary compressor into the primary air conditioning system, auxiliary air conditioning may be provided without the addition of separate air conditioning units on the exterior of the vehicle. The auxiliary air conditioning system according to the invention therefore does not affect the vehicle's aerodynamics or its height, and also reduces the multiplicity of components.

The primary air conditioning system of the vehicle is adapted to operate using a suitable refrigerant and includes a primary compressor, condenser, evaporator and blower, all connected by suitable refrigerant lines, and a primary control system for controlling the operation of the system components. The primary compressor is powered by the vehicle's engine through an appropriate mechanical linkage. Therefore, when the engine is not in operation, the primary air conditioning system by itself is incapable of supplying refrigerated air conditioning to the vehicle.

In one preferred form of the invention, the auxiliary compressor is connected by suitable refrigerant lines between the primary condenser and the primary evaporator in parallel with the primary compressor. A suitable, preferably alternating current, electric motor is connected to the auxiliary compressor for powering the compressor. When the vehicle engine is not being operated, the auxiliary compressor, powered by its electric motor, receives low pressure refrigerant from the primary evaporator, compresses the refrigerant, and supplies the refrigerant via an appropriate high pressure line to the primary condenser. The compressed refrigerant passes through the condenser where it is condensed, through the evaporator including appropriated fluid expansion or decompression means for expansion and evaporation, and then back to the auxiliary compressor to begin another cycle through the system.

Since the primary compressor and the auxiliary compressor are connected in parallel, the auxiliary air conditioning system includes means for preventing the back flow of compressed refrigerant back through which ever compressor is not being operated. Preferably, a primary compressor check valve is positioned in the high pressure line extending from the primary compressor to the primary condenser. Also, an auxiliary compressor check valve is positioned in the line connecting the primary condenser and the auxiliary compressor. When the primary compressor is operated, being powered by the vehicle's engine, the auxiliary compressor check valve prevents the flow of compressed refrigerant from the primary compressor to the auxiliary compressor. Similarly, when the auxiliary compressor is operated, the primary compressor check valve prevents the flow of compressed refrigerant from the auxiliary compressor back through the primary compressor.

The preferred form of the invention also includes control circuitry for controlling the operation of the auxiliary air conditioning system and for preventing the auxiliary compressor from operating when the primary compressor is also operating. Additional protective circuits prevent any operation of the auxiliary system if no proper alternating current power is available for the auxiliary compressor, if the vehicle's ignition key is turned on, and if the refrigerant pressure is too high or two low at particular points in the refrigeration system.

The preferred electric motor for powering the auxiliary compressor is adapted to operate on a suitable alternating current, preferably regular household current, approximately 110 volt AC at 60 cycles. The alternating current power for the auxiliary compressor motor is supplied either by an external power source to which the vehicle may be connected while stationary, by a self-contained auxiliary engine and generator unit, or by a battery or batteries mounted on the vehicle through a suitable DC to AC invertor circuit. Even where the auxiliary compressor motor is adapted to receive AC power from an external power source or an auxiliary generator, the batteries and DC to AC invertor are useful for situations in which no external power source is available and the vehicle is stationary so as to make long term use of the vehicle engine improper. The invention also preferably includes a suitable AC to DC converter/charger to replace power drawn from the batteries to operate the auxiliary air conditioning system where an alternating current source is available.

When the primary air conditioning system of the vehicle is operated, air circulation around the primary condenser is provided either by the motion of the vehicle or by a primary condenser fan. Primary air conditioning systems for vehicles often provide an electric powered primary condenser fan to augment circulation around the condenser when the vehicle is moving or to provide circulation when the vehicle is stationary for short periods of time. According to the invention, an auxiliary condenser fan is provided for circulating air across the primary condenser to assist in the heat transfer required to condense the compressed refrigerant in the primary condenser coil. Although the auxiliary condenser fan may be powered by alternating current, in one preferred form of the invention, the auxiliary condenser fan is powered by a direct current provided either by the external AC source through a converter or by the batteries. Alternatively, the vehicle's primary condenser fan may serve as the auxiliary condenser fan, again being powered by batteries or the external alternating current source and AC to DC converter.

In one preferred form of the invention, a complete auxiliary condenser and auxiliary condenser fan unit is provided to condense the compressed refrigerant from the auxiliary compressor. The auxiliary condenser and condenser fan unit offer several advantages. First, the auxiliary condenser and condenser fan unit may be used to increase the cooling capacity of the auxiliary air conditioning system. Also, the auxiliary condenser and condenser fan unit may be easier to incorporate into the vehicle's primary air conditioning system. For example, there may be insufficient room around the vehicle's primary condenser for the required auxiliary condenser fan. The auxiliary condenser and condenser fan unit is preferably incorporated into the primary air conditioning system of the vehicle in series with the vehicle's primary condenser. In series connection, condensed refrigerant flows through suitable refrigerant lines from the auxiliary condenser to the primary evaporator via the vehicle's primary condenser. Such series connection improves the condensing ability of the auxiliary air conditioning system, as well as the primary system.

In the preferred form of the invention, the auxiliary air conditioning control system includes a separate thermostat for controlling the operation of the auxiliary compressor and auxiliary condenser fan. The primary evaporator blower may be operated either by the primary air conditioning system controls when the primary air conditioning system is being operated, or by the auxiliary air conditioning control system when the auxiliary air conditioning system is being operated.

In another form of the invention, the auxiliary air conditioning system is completely separate from the primary system and included an auxiliary compressor powered by a suitable electric motor, an auxiliary condenser and condenser fan unit, and an auxiliary evaporator blower. However, pursuant to the invention, the auxiliary evaporator and blower are separated from the auxiliary compressor and condenser and mounted on the interior of the vehicle to be cooled. The auxiliary compressor and condenser are preferably mounted under the vehicle, between vehicle frame members. Thus, in this form of the invention, similarly to the form of the invention in which the auxiliary air conditioning system is incorporated into the primary air conditioning system, the auxiliary system components may be conveniently located in the vehicle so as not to increase the vehicle's height or add any unsightly vents on the body of the vehicle.

These and other objects, advantages, and features of the invention will be apparent from the following description of the preferred embodiments, considered along with the accompanying drawings.

BRIEF DESCRIPTION OF THE DRAWINGS

FIG. 2 is a schematic diagram illustrating the control system for the auxiliary air conditioning system illustrated in FIG. 1.

DESCRIPTION OF THE PREFERRED EMBODIMENTS

Figure 1:
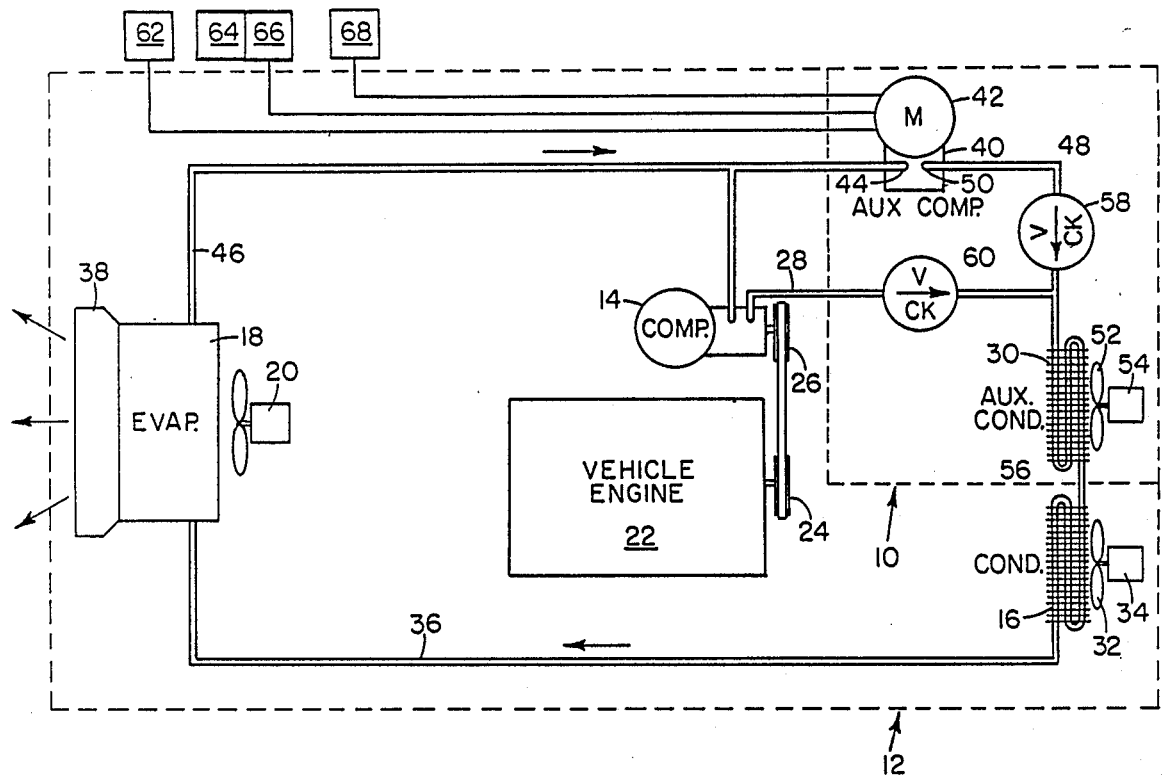
FIG. 1 is a schematic diagram illustrating an auxiliary refrigerated air conditioning system embodying the principles of the invention.

FIG. 1 illustrates, schematically, an auxiliary refrigerated air conditioning apparatus for vehicles embodying the principles of the invention, generally indicated within the dotted line at reference number 10. The auxiliary air conditioning apparatus is incorporated into the vehicle's primary air conditioning system which is generally indicated within the dotted line at reference number 12. The incorporated auxiliary apparatus 10 eliminates the need for a complete separate air conditioning unit or units for providing air conditioning when the vehicle is stationary for long periods.

The primary air conditioning system 12 includes a primary compressor 14 for compressing a suitable refrigerant, a primary condenser 16, and a primary evaporator 18 and blower 20. A vehicle engine 22 supplies the power required to operate the primary air conditioning system. A mechanical linkage 24 links the engine 22 and the primary compressor 14, the linkage including a suitable clutch 26 for selectively driving the primary compressor.

In the form of the invention illustrated in FIG. 1, the primary compressor 14 supplies compressed refrigerant to a primary condenser through a suitable high pressure line 28 and an auxiliary condenser 30 which is part of the auxiliary air conditioning apparatus 10. The primary condenser 16 is adapted to condense the compressed refrigerant supplied by the primary compressor 14. A primary condenser fan 32, powered by a suitable electric motor 34, is provided in the illustrated form of the invention to improve or augment the circulation around the primary condenser to facilitate the heat transfer required to condense the refrigerant when the primary air conditioning system is operating.

The vehicle's primary air conditioning system 12 also includes a suitable high pressure refrigerant line 36 connecting the primary evaporator 18 and the primary condenser 16. In most primary systems additional condensed refrigerant conditioning equipment such as a suitable receiver-drier will be connected in the line 36. A distribution system 38 receives refrigerated air provided by the primary evaporator 18 and evaporator blower 20 and distributes the refrigerated air to the interior of the vehicle. The distribution system 38 preferably includes appropriate ducting and vents (not shown) to provide refrigerated air to the vehicle cab as well as the remainder of the vehicle. For example, when the vehicle is a recreational vehicle, the distribution system may include ducting extending throughout the interior of the recreational vehicle and a number of vents for distributing the refrigerated air to passengers in the rear of the vehicle.

The auxiliary air conditioning apparatus 10 illustrated in FIG. 1 includes an auxiliary compressor 40 powered by an electric auxiliary compressor motor 42 and also includes the auxiliary condenser 30. The auxiliary compressor 40 is connected to receive low pressure refrigerant at its suction intake 44 from the same low pressure return line 46 that feeds low pressure refrigerant from the primary evaporator 18 to the primary compressor 14. A high pressure auxiliary compressor line 48 is connected to deliver compressed refrigerant from the high pressure output 50 of the auxiliary compressor 40 to the auxiliary condenser 30. An auxiliary condenser fan 52 with electric motor 54 is provided for circulating air around the auxiliary condenser 30 when the auxiliary air conditioning system is operated. The auxiliary condenser 30 is connected to deliver compressed and condensed refrigerant to the primary condenser 16, that is, the two condensers are connected in series.

The auxiliary air conditioning apparatus also includes an auxiliary compressor check valve 58 positioned in the high pressure auxiliary compressor line 48 for allowing the flow of refrigerant only in a direction from the auxiliary compressor 40 to the auxiliary condenser 30. A primary compressor check valve 60 is included in the high pressure line 28 connecting the primary compressor 14 to the auxiliary condenser 30 for preventing flow from the auxiliary compressor 40 back through the primary compressor when the auxiliary compressor is operating.

The auxiliary compressor motor 42 is preferably adapted to operate on a suitable alternating current. The current may be provided by an external source 62, by a suitable auxiliary battery 64 mounted on the vehicle through a DC to AC invertor 66 or by a self-contained auxiliary generator unit 68 mounted on the vehicle.

The primary air conditioning system 12 is adapted to operate when the vehicle engine 22 is running, particularly, when the vehicle is moving. In operation, the primary compressor clutch 26 is released so that the vehicle engine drives the primary compressor 14. The primary compressor 14 receives low pressure refrigerant from the low pressure refrigerant return line 46, compresses the refrigerant, and delivers the compressed refrigerant to the primary condenser 16. Compressed refrigerant is delivered from the primary compressor 14 to the primary condenser 16 through the primary compressor line 28 having the primary compressor check valve 60, the auxiliary condenser 30, and the condenser connector line 56. The auxiliary compressor check valve 58 prevents the flow of compressed refrigerant from the primary compressor 14 back through the auxiliary compressor 40 while the primary air conditioning system is operating.

The motion of the vehicle may provide sufficient circulation around the primary condenser 16 to provide sufficient heat transfer for condensing the compressed refrigerant. However, the primary condenser fan 32 powered by its electric motor 34 may be needed to provide circulation around the primary condenser when the vehicle movement is insufficient to provide the necessary circulation, particularly when the vehicle is stationary for short periods while the primary air conditioning system 12 is still running, at stop lights for example.

From the primary condenser 16, condensed refrigerant is supplied to the primary evaporator through the high pressure condensed refrigerant line 36, the direction of flow being indicated by arrow A in FIG. 1. The primary evaporator 18, including suitable decompression means such as an expansion valve (not shown), expands and evaporates the condensed refrigerant thereby cooling air circulated around the primary evaporator by the evaporator blower 20. The circulated air provided by the evaporator blower 20 may be air recirculated from the vehicle interior, outside air, or a mixture of outside and recirculated air. In any case, the air cooled by the primary evaporator 18 is forced into the distribution system 38 by the evaporator blower 20 and distributed by the distribution system to the interior of the vehicle.

The vehicle's primary air conditioning system 12 can provide air conditioning to the vehicle only when the vehicle engine is operating. There are many situations in which air conditioning may be desired but in which the vehicle engine cannot or should not be operated. For example, it would be harmful to the vehicle engine, or at least inefficient, to run the vehicle engine for extended periods of time solely for the purpose of powering the primary compressor 14 to provide refrigerated air conditioning to the vehicle. In these situations, the auxiliary air conditioning apparatus 10 illustrated in FIG. 1 can provide air conditioning for the vehicle. In some situations an external power source 62 will be available such as at RV parks, for example, and the auxiliary compressor motor 42 may be conveniently connected to receive external power. In the preferred form of the invention, the auxiliary compressor motor is adapted to operate on normal household current, that is, 110 volt, 60 cycle alternating current. Where no external power source is available, such as when the recreational vehicle is parked at an unimproved campsite, the auxiliary compressor motor may be powered by the auxiliary battery 64 mounted in the vehicle. The direct current from the battery is inverted to the appropriate alternating current and voltage with the DC to AC invertor 66. Alternatively, auxiliary power may be supplied by the auxiliary generating unit 68.

The operation of the auxiliary air conditioning apparatus illustrated in FIG. 1 will now be described. With the vehicle engine off, the auxiliary compressor 40 receives low pressure refrigerant from the low pressure return line 46 and compresses the refrigerant similarly to the primary compressor 14 when the primary air conditioning system 12 is operating. The auxiliary compressor 40 delivers compressed refrigerant to the auxiliary condenser 30 through the high pressure auxiliary compressor line 48 including the auxiliary compressor check valve 58. The primary compressor check valve 60 prevents the back flow of compressed refrigerant from the auxiliary compressor 40 to the primary compressor 14.

In the form of the invention illustrated in FIG. 1, the auxiliary condenser 30 condenses the compressed refrigerant supplied by the auxiliary compressor 40. Since the vehicle is stationary when the auxiliary air conditioning apparatus 10 is being operated, the auxiliary condenser 30 includes the auxiliary condenser fan 52 for providing the required circulation of air around the condenser. The auxiliary condenser fan motor 54 preferably operates on direct current from the auxiliary battery 64. However, the motor 54 may alternatively operate on the same type of current used to power the auxiliary compressor motor 42, for example 110 volt, 60 cycle alternating current.

The refrigerant condensed in the auxiliary condenser 30 flows through the connector line 56, the primary condenser 16 and then into the primary evaporator 18 through the high pressure condensed refrigerant line 36. As in the operation of the vehicle's primary air conditioning system 12, the condensed refrigerant is expanded and evaporated in the primary evaporator 18 and the evaporator blower 20 is operated to circulate air past the evaporator coil and into the distribution system 38 to be distributed throughout the vehicle. The evaporated refrigerant then flows from the primary evaporator 18 back through the low pressure return line 46 and to the suction intake 44 of the auxiliary compressor 40.

As will readily be appreciated from the embodiment illustrated in FIG. 1, an auxiliary air conditioning system pursuant to the invention may readily be incorporated into the original or factory built air conditioning system of a vehicle. The preferred auxiliary air conditioning system also significantly reduces the number of parts required to provide air conditioning both while the vehicle is in motion and while the vehicle is stationary.

The auxiliary air conditioning system illustrated in FIG. 1, also includes control means for controlling the operation of the auxiliary compressor 40, the auxiliary condenser fan 52, and the evaporator blower 20 when utilized in the auxiliary air conditioning system. One preferred control means 70 is illustrated in FIG. 2. The control means 70 is adapted to receive direct current from either a vehicle battery 72 or the auxiliary battery 64 and to control the preferred alternating current supplied through line 74 to drive the auxiliary compressor motor 42. Where no AC power source is available, the alternating current is provided by the auxiliary battery 64 through the DC to AC invertor 66. In either case, alternating current is supplied to a main breaker box 76 which limits the amount of current that may be supplied to particular elements in the system. In the illustrated preferred form of the invention, an AC to DC converter 67 serves as a charger for recharging the auxiliary power source 64 mounted in the vehicle when the alternating current system is supplied power through the alternating current line 74 from an external power source (62 in FIG. 1).

The control means 70 uses primarily a series of relays for controlling the power supplied to the auxiliary compressor motor 42 and the auxiliary condenser fan motor 54. The alternating current supplied to the auxiliary compressor motor 42 is controlled by an auxiliary compressor relay 78 while the direct current supplied to the auxiliary condenser fan motor 54 is controlled by a condenser fan relay 80. In the illustrated preferred form of the control means 70, the control signal used to operate both the auxiliary condenser fan relay 80 and the auxiliary compressor relay 78 is delivered through a voltage-on-relay 82 and an ignition-on-relay 84. The voltage-on-relay 82 operates to maintain the contacts of both the auxiliary compressor relay 78 and the auxiliary condenser fan relay 80 in the open or off position when improper or insufficient voltage is supplied to the system. The ignition-on-relay 84 operates to maintain the contacts of the auxiliary compressor relay 78 and the auxiliary condenser fan relay 80 in the open or off position when the vehicle ignition is on. The ignition-on-relay 84 receives its control signal in the illustrated form of the invention from the vehicle's main fuse panel 86.

An auxiliary thermostat 88 is adapted for controlling a DC signal provided by the auxiliary battery 64 to control a thermostat relay 90. The current controlled by the thermostat relay 90 serves as a control signal for a compressor clutch relay 92, an auxiliary evaporator blower relay 94 and an auxiliary control power relay 96.

The main vehicle battery 72 supplies direct current to a primary air conditioner dash control 98 and also supplies power to a primary evaporator blower relay 100 through the vehicle's fuse panel 86. In the illustrated control means 70, the auxiliary evaporator blower relay 94 operates in conjunction with the primary evaporator blower relay 100 to supply direct current operating power to the evaporator blower 20. When the primary air conditioning system as in FIG. 1 is operating, the dash control 98 sends a control signal to the primary evaporator blower relay 100 causing the contact of the relay to close so as to supply DC power from the vehicle battery 72 to the evaporator blower 20.

However, when the auxiliary air conditioning system is operating, DC power is supplied to the evaporator blower 20 from the auxiliary battery 64 through the auxiliary blower relay 94 and the primary blower relay 100. The control signal for closing the blower relay contacts, however, is provided through the dash controls 98 regardless of which air conditioning system is being operated in the illustrated preferred control means 70.

A low pressure switch 104 is preferably included, for cutting off the power to the primary compressor motor 42 if the pressure on the low pressure side of the air conditioning system reaches a predetermined cut-off level. The low pressure switch 104 may preferably be positioned so as to sense the refrigerant pressure just after the evaporator 16, on the line 46 for example.

Figure 3:
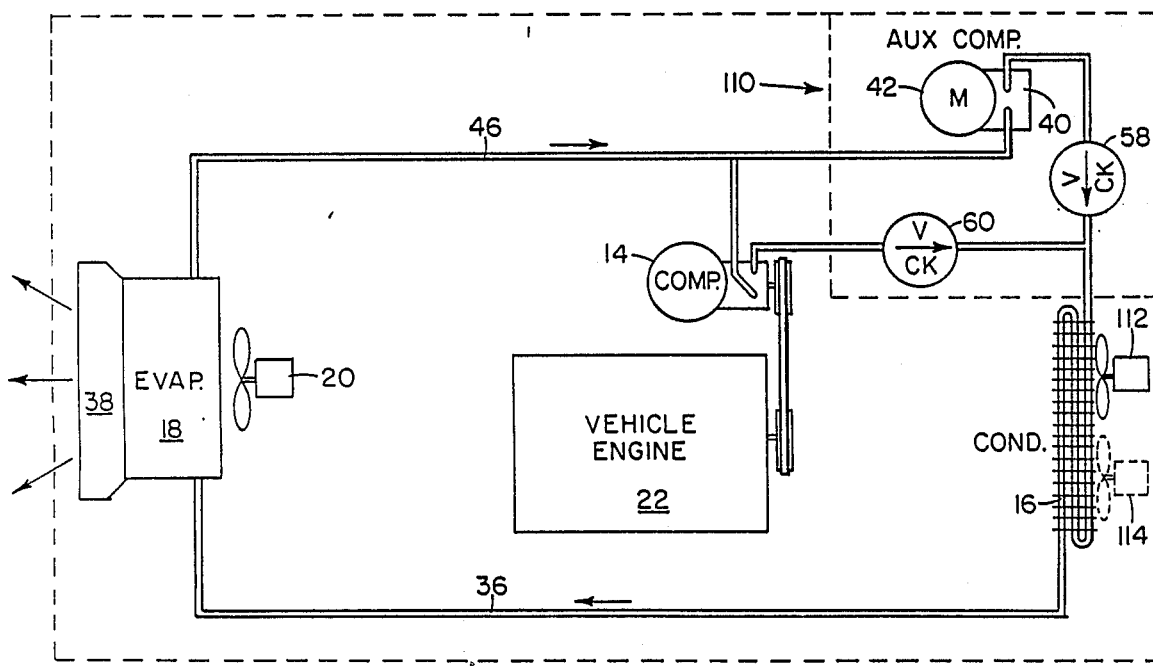
FIG. 3 is a schematic diagram illustrating an alternate form of an auxiliary air conditioning system embodying the principles of the invention.

FIG. 3 illustrates another preferred form of the invention. In this embodiment, an auxiliary air conditioning apparatus, indicated within the dotted line 110, includes the auxiliary compressor 40 powered by the auxiliary compressor electric motor 42, the auxiliary compressor check valve 58 and the primary compressor check valve 60 similar to the embodiment illustrated in FIG. 1. The primary air conditioning system, indicated within the dotted line 12, includes the primary condenser 16, the primary compressor 14 powered by the vehicle engine 22, and the evaporator 18 and blower 20 along with the appropriate connecting lines 36 and 46 as in the embodiment shown in FIG. 1.

By contrast to the embodiment of FIG. 1, the embodiment of the invention illustrated in FIG. 3 does not include a separate auxiliary condenser (30 in FIG. 1) rather, the system refrigerant is condensed by the vehicle's primary condenser 16 regardless of which compressor 14 or 40 is operating. In other words, the primary condenser 16 also serves as an auxiliary condenser in the form of the invention illustrated in FIG. 3. An auxiliary condenser fan 112 provides the necessary circulation of air around the condenser 16 while the auxiliary air conditioning apparatus is operating (when the vehicle is stationary). Also, a primary condenser fan shown in phantom at 114 may be included in the primary air conditioning system to augment circulation while the primary air conditioning system is operated. Alternatively, the single condenser fan 112 may be adapted to provide circulation around the condenser 16 when it condenses refrigerant compressed by both the primary compressor 14 and the auxiliary compressor 40.

The embodiment illustrated in FIG. 3, including both the separate primary condenser fan 114 and the auxiliary condenser fan 112, preferably utilizes a control means such as that illustrated in FIG. 2. However, in the form of the invention where a single condenser fan such as fan 112 operates with both the primary and auxiliary compressor 14 and 40, respectively, the condenser fan relay 80 as illustrated in FIG. 2 will control the power supplied to the single condenser fan 112 rather than a separate condenser fan such as illustrated in FIG. 2.

Figure 4:
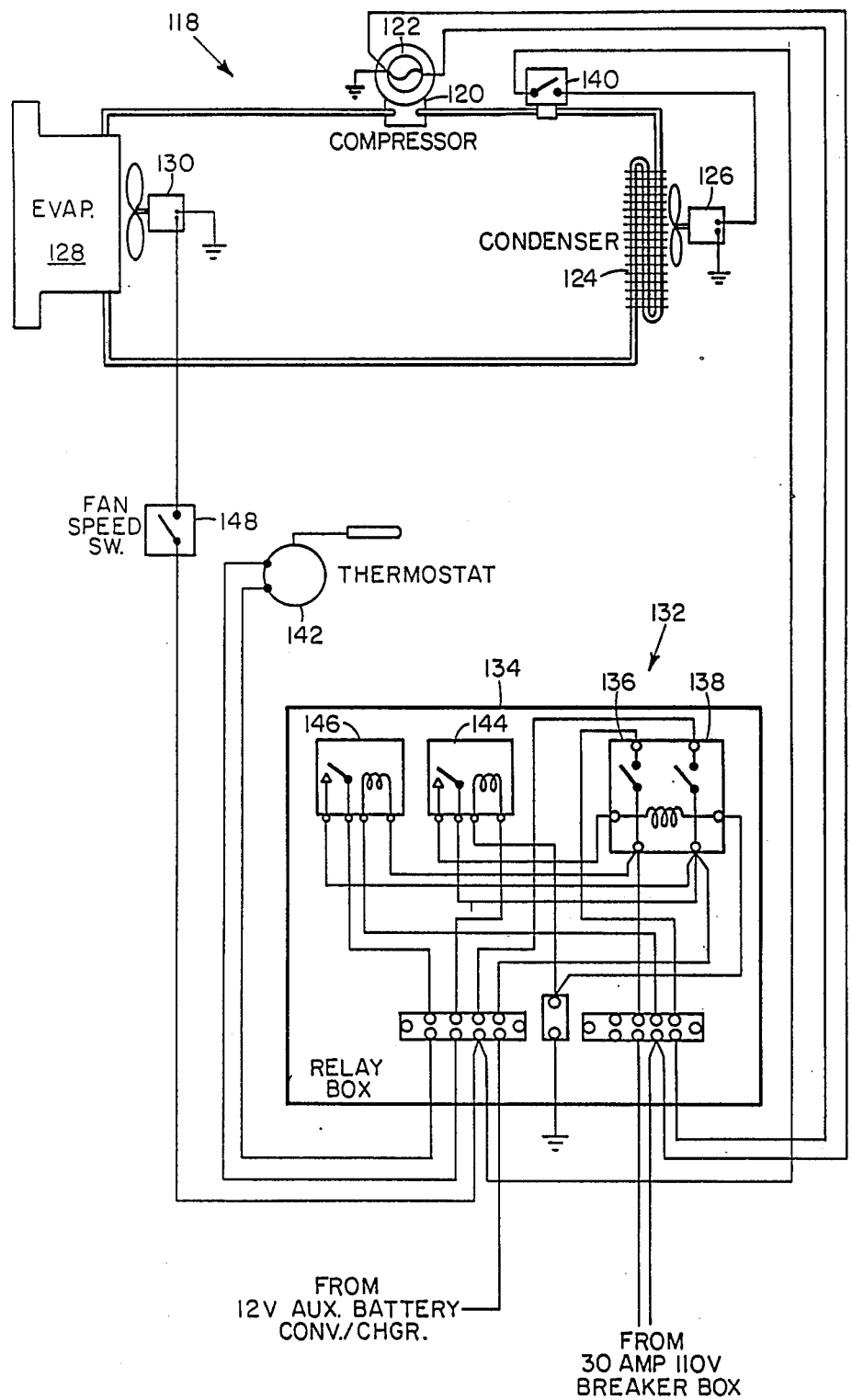
FIG. 4 is a schematic diagram illustrating an alternate form of the invention having a complete and separate auxiliary air conditioning system for a vehicle with the evaporator separated from the compressor and condenser.

In another form of the invention, illustrated in FIG. 4, an auxiliary air conditioning apparatus 118 includes a complete and separate air conditioning system having an auxiliary compressor 120 powered by an auxiliary compressor motor 122, an auxiliary condenser 124, an auxiliary condenser fan 126, and an auxiliary evaporator 128 and blower 130. However, pursuant to the invention, the auxiliary evaporator 128 and blower 130 are separated from the auxiliary compressor 120 and auxiliary condenser 124. This separation allows the auxiliary air conditioning apparatus 118 to be conveniently housed within the vehicle so as not to affect the vehicle's aerodynamics or height requirement. For example, the auxiliary compressor 120 and condenser 124 are preferably mounted under the vehicle, between vehicle frame members. The auxiliary evaporator 128 and blower 130 are small enough that they may be positioned conveniently inside the vehicle so as to not affect vehicle aerodynamics or appearance.

FIG. 4 also shows one preferred control means 132 for controlling the operation of the auxiliary air conditioning system. The control means 132 includes a relay box 134 that is adapted to receive both a suitable alternating current for powering the compressor motor and also a suitable direct current for providing a control signal and also for powering the auxiliary condenser fan 126 and the blower 130. The alternating current can be supplied either by an external power source, an auxiliary battery through a DC to AC invertor, or by a separate generating unit as discussed above with regard to FIGS. 1 and 2.

The control means 132 includes an auxiliary compressor relay 136 for controlling the current to the auxiliary compressor motor 122, and an auxiliary condenser fan relay 138 for controlling the power supplied to the auxiliary condenser fan 126. A condenser fan switch 140 allows the condenser fan 126 to operate only when a certain pressure is maintained in the high pressure line connecting the auxiliary compressor 120 and the auxiliary condenser 124. The control means also includes a thermostat 142, a thermostat relay 144, and a voltage on relay 146 for providing a control signal for the auxiliary compressor relay 136 and the auxiliary condenser fan relay 138. A fan speed switch 148 controls the speed of the blower 130.

The above described preferred embodiments are intended to illustrate the principles of the invention, but not to limit the scope of the invention. Various other embodiments and modifications to these preferred embodiments, particularly regarding the refrigerant control lines and the control circuitry, may be made by those skilled in the art without departing from the scope of the following claims.

What is claimed is:

1. An auxiliary refrigerated air conditioning apparatus for vehicles and the like having a vehicle electrical system and a primary refrigerated air conditioning system that includes a primary compressor powered by a self-contained vehicle engine for compressing a suitable refrigerant, a primary condenser connected to the primary compressor for condensing the compressed refrigerant, a primary evaporator connected to the primary condenser for evaporating the refrigerant, an evaporator blower for circulating for evaporating to supply cooled air to a refrigerated air distribution system in the vehicle, and a return line for returning the evaporated refrigerant to the primary compressor, the auxiliary air conditioning apparatus comprising:

A. auxiliary compressor means connected to the return line and to the primary condenser for receiving low pressure refrigerant from the primary evaporator, compressing the refrigerant, and supplying compressed refrigerant to the primary condenser when the primary compressor is not operating;

B. an auxiliary compressor electric motor connected to the auxiliary compressor means for powering the auxiliary compressor means, the electric motor being adapted to operate on a suitable alternating current;

C. primary compressor check valve means connected between the primary condenser and the primary compressor for preventing the flow of refrigerant from the auxiliary compressor to the primary compressor when the auxiliary compressor is operating;

D. auxiliary compressor check valve means connected between the primary condenser and the auxiliary compressor for preventing the flow of refrigerant from the primary compressor to the auxiliary compressor when the primary compressor is operating;

E. auxiliary condenser blower means for circulating air past the primary condenser when the auxiliary compressor is operating;

F. control means for controlling the operation of the auxiliary compressor electric motor and for controlling the operation of the auxiliary condenser blower means; and G. ignition-on relay means included in the control means and connected for receiving a control signal from the vehicle electrical system, the ignition-on relay means for preventing the auxiliary compressor from operating when said control signal is received.

2. The auxiliary air conditioning apparatus of claim 1 wherein the control means includes compressor clutch relay means for preventing the auxiliary compressor from operating when the primary compressor is operating.

3. The auxiliary air conditioning apparatus of claim 1 wherein the control means includes voltage-on relay means for preventing the operation of the auxiliary compressor when the alternating current for powering the auxiliary compressor motor is improper.

4. An auxiliary refrigerated air conditioning apparatus for vehicles and the like having a vehicle electrical system and primary refrigerated air conditioning system including a primary compressor powered by a self-contained vehicle engine for compressing a suitable refrigerant, a primary condenser connected to the primary compressor for condensing the compressed refrigerant, a primary evaporator connected to the primary condenser for evaporating the refrigerant, an evaporator blower for circulating air past the evaporator to supply cooled air to a refrigerated air distribution system in the vehicle, and a return line for returning the evaporated refrigerant to the primary compressor, the auxiliary air conditioning apparatus comprising:

A. auxiliary compressor means connected to the return line and also connected to the primary condenser for receiving refrigerant from the primary evaporator and for compressing the refrigerant;

B. an auxiliary compressor electric motor connected to the auxiliary compressor means for powering the auxiliary compressor means, the electric motor being adapted to operate on alternating current;

C. auxiliary condenser means connected between the auxiliary compressor means and the primary condenser for receiving compressed refrigerant from the auxiliary compressor means and for condensing compressed refrigerant;

D. primary compressor check valve means connected between the auxiliary condenser means and the primary compressor for preventing the flow of refrigerant from the auxiliary compressor to the primary compressor;

E. auxiliary compressor check valve means connected between the auxiliary condenser and the auxiliary compressor for preventing the flow of refrigerant from the primary compressor to the auxiliary compressor;

F. control means for controlling the operation of the auxiliary compressor electric motor; and G. voltage-on relay means included in the control means for preventing the auxiliary compressor from operating when the alternating current for powering the auxiliary compressor motor is improper.

5. An auxiliary refrigerated air conditioning apparatus for vehicles and the like having a primary refrigerated air conditioning system including a primary compressor powered by a self-contained vehicle engine for compressing a suitable refrigerant, a primary condenser connected to the primary compressor for condensing the compressed refrigerant, a primary evaporator connected to the primary condenser for evaporating the refrigerant, an evaporator blower for circulating air past the evaporator to supply cooled air to a refrigerated air distribution system in the vehicle, and a return line for returning the evaporated refrigerant to the primary compressor, the auxiliary air conditioning apparatus comprising:

A. auxiliary compressor means connected to the return line and also connected to the primary condenser for receiving refrigerant from the primary evaporator and for compressing the refrigerant;

B. an auxiliary compressor electric motor connected to the auxiliary compressor means for powering the auxiliary compressor means, the electric motor being adapted to operate on alternating current;

C. auxiliary condenser means connected between the auxiliary compressor means and the primary condenser for receiving compressed refrigerant from the auxiliary compressor means and for condensing compressed refrigerant;

D. primary compressor check valve means connected between the auxiliary condenser means and the primary compressor for preventing the flow of refrigerant from the auxiliary compressor to the primary compressor;

E. auxiliary compressor check valve means connected between the auxiliary condenser and the auxiliary compressor for preventing the flow of refrigerant from the primary compressor to the auxiliary compressor;

F. control means for controlling the operation of the auxiliary compressor electric motor; and G. ignition-on relay means included in the control means and connected for receiving a control signal from the vehicle electrical system, the ignition-on relay means for preventing the operation of the auxiliary compressor when said control signal is received.

* * * * *